United States Patent
Chen

[11] Patent Number: 6,130,907
[45] Date of Patent: Oct. 10, 2000

[54] INTERFERENCE DETECTION FOR SPREAD SPECTRUM SYSTEMS

[75] Inventor: Guangzhi Michael Chen, Paramus, N.J.

[73] Assignee: Lucent Technologies Inc., Murray Hill, N.J.

[21] Appl. No.: 09/006,983

[22] Filed: Jan. 14, 1998

[51] Int. Cl.[7] .......................... H04B 15/00; G01R 23/00; G01R 23/16; G01S 3/02; H04K 1/00
[52] U.S. Cl. ................ 375/200; 324/76.19; 324/76.21; 324/76.22
[58] Field of Search .............. 324/76.19, 76.21, 324/76.22; 35/200, 130

[56] References Cited

U.S. PATENT DOCUMENTS

| | | | |
|---|---|---|---|
| 4,118,666 | 10/1978 | Bernstein | 324/76.26 |
| 4,504,785 | 3/1985 | Tucker et al. | 324/76.24 |
| 5,175,880 | 12/1992 | Brown | 455/226.1 |
| 5,451,839 | 9/1995 | Rappaport et al. | 375/224 |

*Primary Examiner*—Stephen Chin
*Assistant Examiner*—Paul N Rupert
*Attorney, Agent, or Firm*—Steve Mendelsohn

[57] ABSTRACT

In spread spectrum systems, such as CDMA-based systems, the presence of even narrow-band interference, such as that caused by jamming at a particular frequency, can adversely affect all of the current users in the system. According to the present invention, interference is detected and characterized by accumulating statistics for each energy spectrum in the system (e.g., for both the forward link band and the reverse link band in a telecommunication system). In particular, since a spread spectrum is ideally flat across the entire frequency band, narrow-band interference can be detected based on a significant deviation between the signal strength at any one frequency and the average signal level across the entire band. Similarly, wide-band interference can be detected based on the variance level over the entire frequency band. In a preferred embodiment, a pair of receivers are designed to perform background interference-detection processing for both the forward and reverse link.

21 Claims, 1 Drawing Sheet

INTERFERENCE DETECTION FOR SPREAD SPECTRUM SYSTEMS

BACKGROUND OF THE INVENTION

1. Field of the Invention

The present invention relates to communications, and, in particular, to spread spectrum telecommunication systems such as code division multiple access (CDMA) communication systems.

2. Description of the Related Art

FIG. 1 shows the frequency spectra for a conventional frequency division multiple access (FDMA) telecommunication system comprising a base station and a plurality of mobile units (e.g., cellular telephones). The base station transmits signals to the mobile units (i.e., the forward link) using Frequency Band A, and the mobile units transmit signals to the base station (i.e., the reverse link) using Frequency Band B. In FDMA communications, each frequency band is divided into a number of different channels, where each channel corresponds to a different unique frequency sub-band. Each mobile unit is assigned a different channel in each frequency band for communications with the base station. Narrow-band interference occurs when unauthorized (e.g., jamming) signals are transmitted in at least one of the channels in at least one of the frequency bands. Although such narrow-band interference is problematic, it will adversely affect the communications of only those users who are currently communicating on those specific channels. Even if the interference cannot be stopped, at least the affected channels can be ignored (i.e., left unassigned) and communications can be supported on the other unaffected channels.

FIG. 2 shows the frequency bands or spectra for a conventional code division multiple access (CDMA) telecommunication system comprising a base station and a plurality of mobile units. In CDMA communications, each of the signals in a frequency band are spread over the entire band with different user channels being distinguished based on the assignment of different codes, such as orthogonal Walsh codes. In such a spread spectrum system, jamming or other narrow-band interference will adversely affect the communications of all of the users at the same time. In the presence of such interference, even when it is limited to a single specific frequency, a telecommunication system might be prevented from supporting any communications at all.

SUMMARY OF THE INVENTION

The present invention is directed to a scheme for detecting the presence of jamming and other types of interference (narrow-band or otherwise) in spread spectrum communication systems such as CDMA-based telecommunication systems. According to the present invention, interference is detected and characterized by accumulating statistics for each energy spectrum in the system (e.g., for both the forward link band and the reverse link band in a telecommunication system). In particular, since a spread spectrum is ideally flat across the entire frequency band, narrow-band interference can be detected based on a significant deviation between the signal strength at any one frequency and the average signal level across the entire band. Similarly, wide-band interference can be detected based on the statistical variance or standard deviation over the entire frequency band. In a preferred embodiment, a pair of receivers are designed to perform background interference-detection processing for both the forward and reverse link.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In a CDMA-based communication system, each signal is spread over an entire frequency band, with different user signals (i.e., different channels) being distinguished by the assignment of unique codes (e.g., orthogonal Walsh codes) that are used to generate the signals. In an ideal CDMA system, the amplitude of the signals is constant across the frequency band. As the number of users changes, the amplitude level shifts up or down depending on whether more users are being added or subtracted, but the signal level strength should remain flat. When narrow-band interference is present, the resulting energy spectrum will deviate from its ideal flat shape.

According to the present invention, statistics on each energy spectrum of a spread spectrum system (e.g., a CDMA-based system) are accumulated over time and used to detect the presence of interference, such as that caused by jamming. According to one embodiment of the present invention, the system infrastructure has a pair of receivers, one for the forward link and one for the reverse link, that hop through the frequency bands gathering data for the accumulated statistics. The term "hop" is commonly understood by those skill in the art as the ability of a communication device, such as a receiver, to tune to various frequencies at different instances. The generation of these statistics is continuously or periodically performed as part of background processing. For example, for a frequency band with a width of 5 MHz, each hopping step (i.e., the interval between samples) could be 10 KHz. At each step, a received signal strength indication (RSSI) sample is recorded for the corresponding frequency. These RSSI samples are used to generate statistics, such as average RSSI and variance or standard deviation over the entire frequency band or spectrum. These statistics are then used to detect and characterize interference in either of the forward or reverse links or both.

Figure 1:
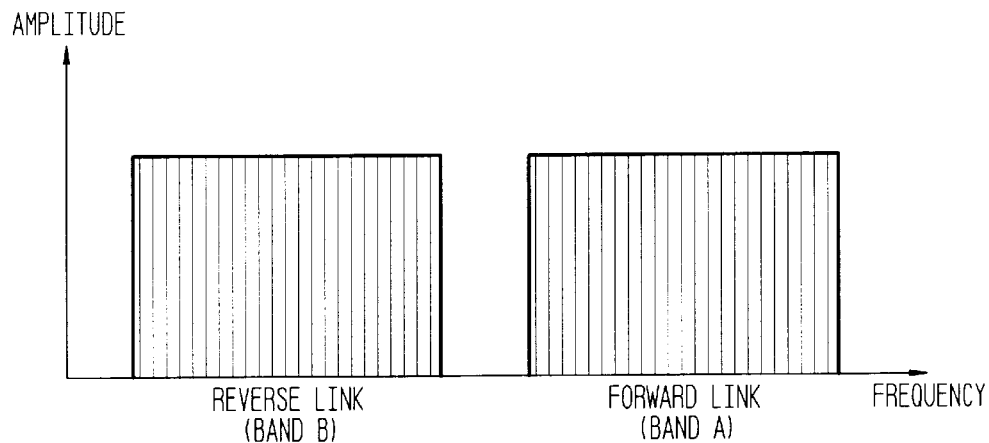
FIG. 1 shows the frequency spectra for a conventional frequency division multiple access (FDMA) telecommunication system.
Figure 2:
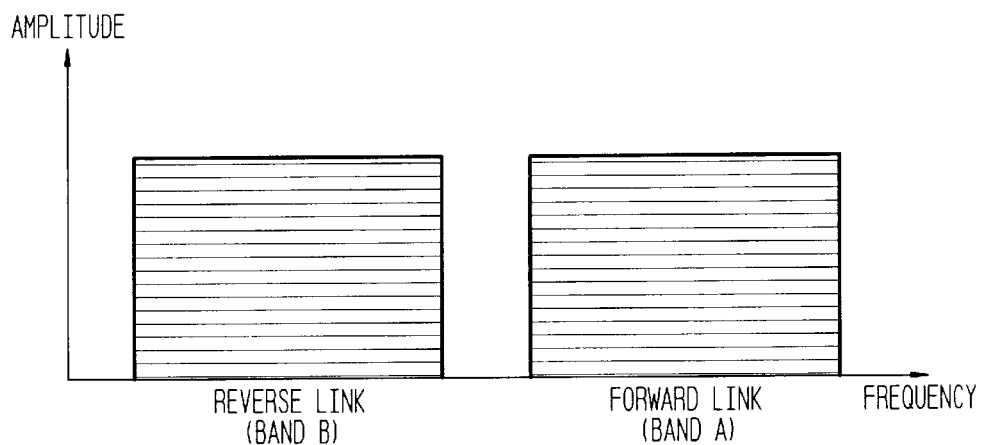
FIG. 2 shows the frequency spectra for a conventional code division multiple access (CDMA) telecommunication system.
Figure 3:
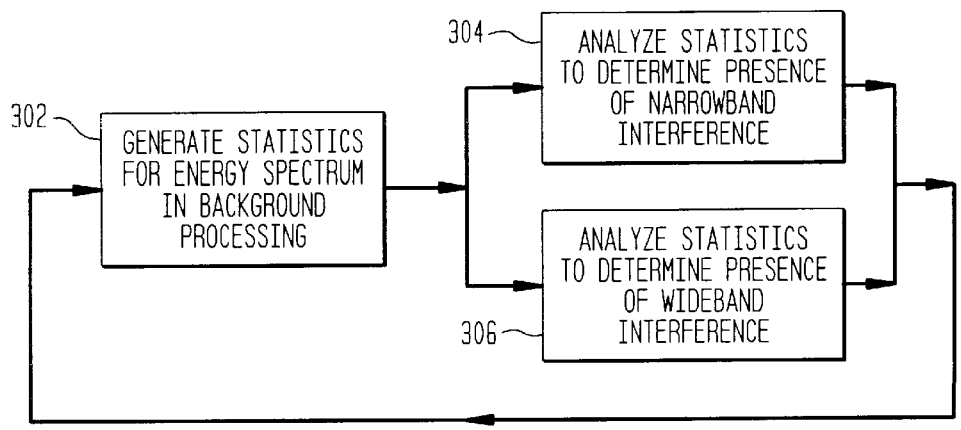
FIG. 3 shows a flow diagram of the background interference-detecting processing, according to one embodiment of the present invention.

FIG. 3 shows a flow diagram of the background interference-detecting processing, according to one embodiment of the present invention. In step 302, statistics are accumulated for each energy spectrum. These statistics may be based solely on the current status of each energy spectrum or may include some filtering that takes into account previous measurements at each frequency step. The generated statistics are then analyzed to determine whether or not there is any narrow-band interference (step 304) or wide-band interference (step 306).

In step 304, the presence of narrow-band interference can be detected based on a large difference between the average RSSI and the signal level at a particular frequency. In particular, the average RSSI over the entire frequency band is generated, and this average RSSI is compared to the RSSI at each frequency step. If the difference between the average RSSI and any particular RSSI is greater than a specified threshold and if that condition persists for a specified number of processing cycles, then narrow-band interference may be determined to be present. In that case, the particular frequency and signal strength of the interference can also be determined.

In addition, in step 306, the variance or standard deviation over the entire frequency band can be used to determine the presence of wide-band interference that spans multiple frequency steps. As described above, in an ideal CDMA system, the energy spectrum is flat and the variance will be zero. When wide-band interference is present, the variance over the energy spectrum will likely be affected. If that variance is greater than a specified threshold for a specified number of cycles, then wide-band interference may be determined to be present. Unless the wide-band interference is spread evenly over the entire frequency band, the variance should be a good indicator of the presence of such interference.

Those skilled in the art will appreciate that the maximum deviation test for narrow-band interference may sometimes—but not always—be an accurate test for the presence of wide-band interference. Likewise, although it may suffice in some situations (e.g., when single-frequency jamming is particularly energetic), the variance test for wide-band interference will not always provide an accurate test for the presence of narrow-band interference. In a preferred embodiment, the system performs both tests, although alternative embodiments may be designed to implement only one of the two, if desired.

Once the interference is detected, its source can be located (e.g., by measuring signal strength levels at different locations) and an appropriate remedy can be applied to reduce or eliminate the interference.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for detecting interference in a spread spectrum system, comprising the steps of:
   (a) generating received signal strength indication (RSSI) samples at a plurality of frequencies across a frequency range of the spread spectrum system;
   (b) generating statistics based on the RSSI samples;
   (c) analyzing the statistics; and
   (d) determining whether interference is present in the frequency range by determining whether the interference corresponds to (1) narrow-band interference occurring over a narrow-band frequency range or (2) wide-band interference over a wide-band frequency range, wherein:
   sizes of the narrow-band and wide-band frequency ranges are both smaller than the frequency range of the spread spectrum system; and
   the size of the narrow-band frequency range is smaller than the size of the wide-band frequency range.

2. The invention of claim 1, wherein the interference is determined to be narrow-band interference based on comparing the RSSI sample at a particular frequency to an average RSSI value for the entire frequency band.

3. The invention of claim 2, wherein narrow-band interference is determined to be present if the difference between the RSSI sample at the particular frequency and the average RSSI value for the entire frequency band is greater than a specified threshold.

4. The invention of claim 3, wherein narrow-band interference is determined to be present if the difference is greater than the specified threshold for a specified number of cycles.

5. The invention of claim 1, wherein the interference is determined to be wide-band interference based on a variance value for the entire frequency band.

6. The invention of claim 5, wherein wide-band interference is determined to be present if the variance value is greater than a specified threshold.

7. The invention of claim 6, wherein wide-band interference is determined to be present if the variance value is greater than the specified threshold for a specified number of cycles.

8. The invention of claim 1, wherein the spread spectrum system is a CDMA-based system.

9. The invention of claim 1, wherein the spread spectrum system has a forward link receiver that samples RSSI values across a forward link and a reverse link receiver that samples RSSI across a reverse link.

10. An apparatus for detecting interference in a spread spectrum system, comprising:
    (a) means for generating received signal strength indication (RSSI) samples across a frequency range of the spread spectrum system;
    (b) means for generating statistics based on the RSSI samples;
    (c) means for analyzing the statistics; and
    (d) means for determining whether interference is present in the frequency range by determining whether the interference corresponds to (1) narrow-band interference occurring over a narrow-band frequency range or (2) wide-band interference over a wide-band frequency range, wherein:
    sizes of the narrow-band and wide-band frequency ranges are both smaller than the frequency range of the spread spectrum system; and
    the size of the narrow-band frequency range is smaller than the size of the wide-band frequency range.

11. A receiver for detecting interference in a spread spectrum system, wherein the receiver comprises:
    a first processing block configured to generate received signal strength indication (RSSI) samples at a plurality of frequencies across a frequency range of the spread spectrum system and to generate statistics based on the RSSI samples; and
    one or more additional processing blocks configured to analyze the statistics and to determine whether interference is present in the frequency range by determining whether the interference corresponds to (1) narrow-band interference occurring over a narrow-band frequency range or (2) wide-band interference over a wide-band frequency range, wherein:
    sizes of the narrow-band and wide-band frequency ranges are both smaller than the frequency range of the spread spectrum system; and
    the size of the narrow-band frequency range is smaller than the size of the wide-band frequency range.

12. The invention of claim 11, wherein the interference is determined to be narrow-band interference based on comparing the RSSI sample at a particular frequency to an average RSSI value for the entire frequency band.

13. The invention of claim 12, wherein narrow-band interference is determined to be present if the difference between the RSSI sample at the particular frequency and the average RSSI value for the entire frequency band is greater than a specified threshold.

14. The invention of claim 13, wherein narrow-band interference is determined to be present if the difference is greater than the specified threshold for a specified number of cycles.

15. The invention of claim 11, wherein the interference is determined to be wide-band interference based on a variance value for the entire frequency band.

16. The invention of claim 15, wherein wide-band interference is determined to be present if the variance value is greater than a specified threshold.

17. The invention of claim 16, wherein wide-band interference is determined to be present if the variance value is greater than the specified threshold for a specified number of cycles.

18. The invention of claim 11, wherein the spread spectrum system is a CDMA-based system.

19. The invention of claim 11, wherein the spread spectrum system has a forward link receiver that samples RSSI values across a forward link and a reverse link receiver that samples RSSI across a reverse link.

20. The invention of claim 1, wherein:

the spread spectrum system is a CDMA-based system;

the interference is determined to be narrow-band interference based on comparing the RSSI sample at a particular frequency to an average RSSI value for the entire frequency band, wherein narrow-band interference is determined to be present if the difference between the RSSI sample at the particular frequency and the average RSSI value for the entire frequency band is greater than a first specified threshold for a first specified number of cycles; and the interference is determined to be wide-band interference based on a variance value for the entire frequency band, wherein wide-band interference is determined to be present if the variance value is greater than a second specified threshold for a second specified number of cycles.

21. The invention of claim 11, wherein:

the spread spectrum system is a CDMA-based system;

the interference is determined to be narrow-band interference based on comparing the RSSI sample at a particular frequency to an average RSSI value for the entire frequency band, wherein narrow-band interference is determined to be present if the difference between the RSSI sample at the particular frequency and the average RSSI value for the entire frequency band is greater than a first specified threshold for a first specified number of cycles; and the interference is determined to be wide-band interference based on a variance value for the entire frequency band, wherein wide-band interference is determined to be present if the variance value is greater than a second specified threshold for a second specified number of cycles.

* * * * *